United States Patent
Arslan et al.

(10) Patent No.: US 8,085,718 B2
(45) Date of Patent: Dec. 27, 2011

(54) PARTIAL RADIO BLOCK DETECTION

(75) Inventors: Guner Arslan, Austin, TX (US);
Shaojie Chen, Austin, TX (US)

(73) Assignee: ST-Ericsson SA, Plan-Les-Ouates (CH)

(*) Notice: Subject to any disclaimer, the term of this patent is extended or adjusted under 35 U.S.C. 154(b) by 851 days.

(21) Appl. No.: 11/478,205

(22) Filed: Jun. 29, 2006

(65) Prior Publication Data
US 2008/0022183 A1 Jan. 24, 2008

(51) Int. Cl.
*H04W 4/00* (2009.01)
(52) U.S. Cl. ......... 370/329; 370/332; 370/336; 714/746
(58) Field of Classification Search .................. None
See application file for complete search history.

(56) References Cited

U.S. PATENT DOCUMENTS

| | | | | |
|---|---|---|---|---|
| 5,978,756 | A * | 11/1999 | Walker et al. | 704/210 |
| 6,999,921 | B2 * | 2/2006 | Harris et al. | 704/215 |
| 2006/0080094 | A1 * | 4/2006 | Katayama et al. | 704/229 |
| 2007/0055501 | A1 * | 3/2007 | Aytur et al. | 704/219 |
| 2007/0140164 | A1 * | 6/2007 | Zeng et al. | 370/329 |

* cited by examiner

*Primary Examiner* — Rafael Pérez-Gutiérrez
*Assistant Examiner* — Daniel Nobile
(74) *Attorney, Agent, or Firm* — Howison & Arnott, L.L.P.

(57) ABSTRACT

A technique includes receiving a radio block from a transmission channel. The radio block includes first data and second data. The technique includes evaluating the first data to obtain a first evaluation result, evaluating the second data to obtain a second evaluation result and determining whether the radio block is a partial block based on the first and second evaluation results.

14 Claims, 7 Drawing Sheets

PARTIAL RADIO BLOCK DETECTION

BACKGROUND

The invention generally relates to partial radio block detection.

Wireless mobile stations, such as cellular handsets (as an example), transmit and receive information, including representations of speech waveforms, in radio frequency (RF) waves. A physical layer of a cellular handset typically includes circuitry for performing two major functions, namely encoding and decoding. This circuitry typically includes a channel codec for performing channel encoding and decoding functions and a vocoder for performing voice encoding and decoding functions. The vocoder performs source encoding and decoding on speech waveforms. Source coding removes redundancy from the waveform and reduces the bandwidth (or equivalently the bit-rate) in order to transmit the waveform in real-time. The channel codec increases redundancy in the transmitted signal to enhance the robustness of the transmitted signal against channel imperfections.

A number of different wireless communication protocols, such as the global system for mobile communications protocol (called "GSM"), employ error correction coding, such as forward error correction (FEC). Communication systems that employ error correction coding may generally use a two-stage receiver architecture that includes an equalizer and a decoder. The function of the equalizer is to undo adverse channel effects, and the function of the decoder is to recover original data bits from the encoded sequence.

Modern communication systems may also use an interleaving scheme to avoid large gaps in the received data if the channel conditions degrade temporarily. After deinterleaving, degraded data symbols are spread among a large number of reliable symbols, allowing the decoder a chance to correctly decode the degraded symbols. In many applications, data is transmitted and received in finite-length packets or bursts. Interleaving in such systems is done over multiple bursts, and hence decoding occurs after a certain number of bursts have been received. For example, in a GSM system data is interleaved over a range of 4 to 22 bursts, depending on the logical channel in use. The equalizer, on the other hand, generally works on each burst separately.

SUMMARY

In an embodiment of the invention, a technique includes receiving a radio block from a communication channel. The radio block includes first data and second data. The technique includes evaluating the first data to obtain a first evaluation result, evaluating the second data to obtain a second evaluation result and determining whether the radio block is a partial block is based on the first and second evaluation results.

In another embodiment of the invention, a mobile station includes a radio and a digital signal processor. The radio receives a radio block of wireless data from a wireless communication channel, and the radio block includes first data that is associated with a first speech frame and second data that is associated with a second speech frame. The digital signal processor determines whether the radio block received from the wireless communication channel is a partial block based on the first and second data.

In another embodiment of the invention, an apparatus includes a buffer and a channel decoder. The buffer receives a radio block of incoming wireless data. The radio block includes first data and second data. The channel decoder determines whether the radio block is a partial block based on an independent evaluation of the first and second data.

In yet another embodiment of the invention, an article includes a storage medium that is accessible by a processor-based system and stores instructions that when executed cause the processor-based system to receive a radio block via a communication channel. The radio block includes first data and second data. The instructions when executed also cause the processor-based system to evaluate the first data, evaluate the second data and determine whether the radio block is a partial block based on of the first and second data.

Advantages and other features of the invention will become apparent from the following drawing, description and claims.

DETAILED DESCRIPTION

Figure 1:
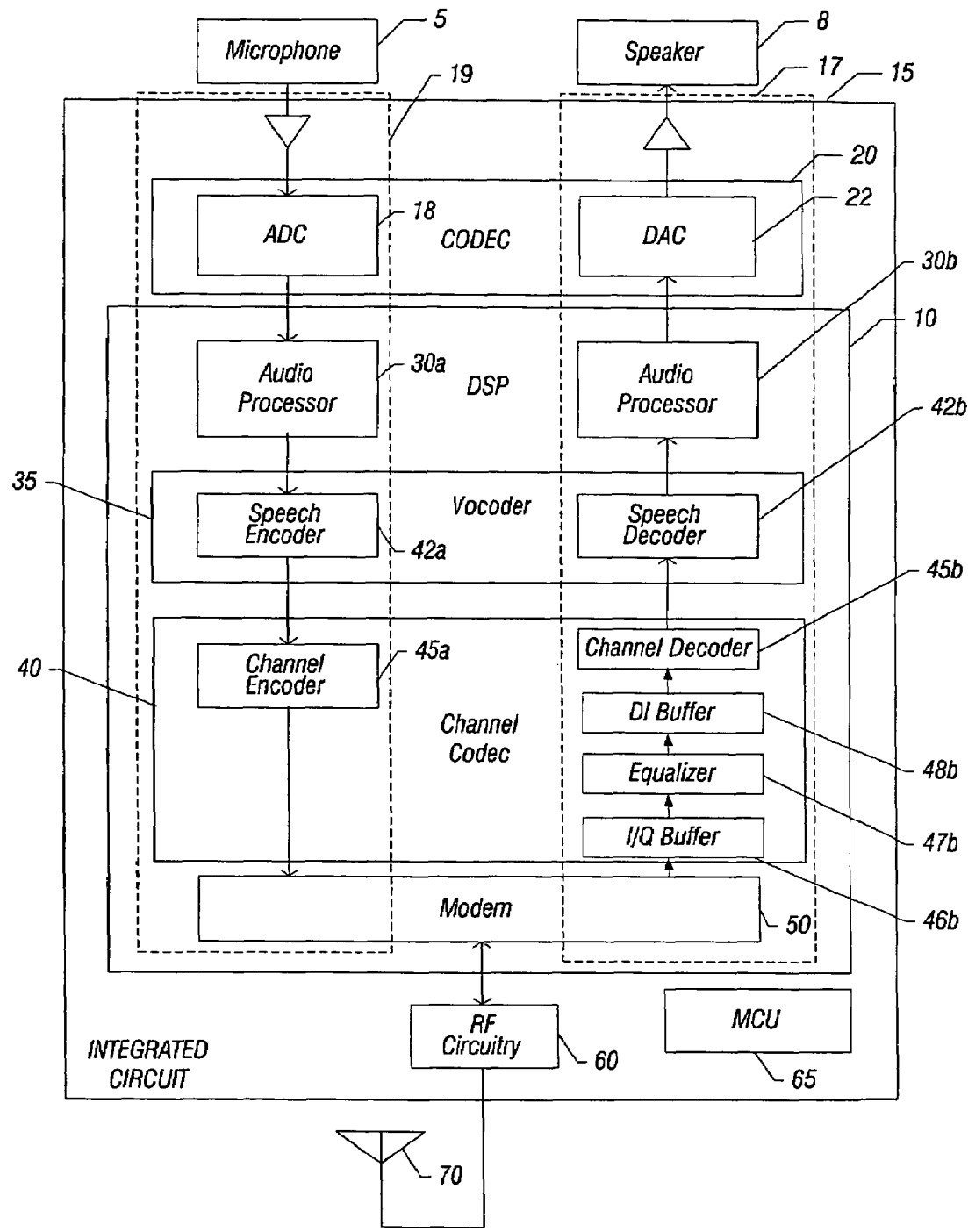
FIG. 1 is a schematic diagram illustrating signal processing paths of a wireless device according to an embodiment of the invention.

In accordance with embodiments of the invention described herein, a wireless device both captures speech for purposes of transmitting speech content over a wireless communication channel and converts received speech content (from the wireless communication channel) into audio content that is played over the wireless device's speaker system. More specifically, the wireless device captures frames of speech data (i.e., digitized time segments of captured speech) and processes the speech frames to convert the speech frames into a form that is suitable for communication over the wireless communication channel. Referring to FIG. 1, in this manner, the wireless device may include an outgoing speech processing path 19 that, among its other functions, applies speech and channel encoding to each speech frame to form an associated block of data, which is referred to as a radio block herein. For purposes of processing received speech data, the wireless device may include an incoming speech processing path 17 that, among its other functions, de-interleaves received transmission bursts into corresponding radio blocks; and applies channel and speech decoding to the radio blocks.

Figure 4:
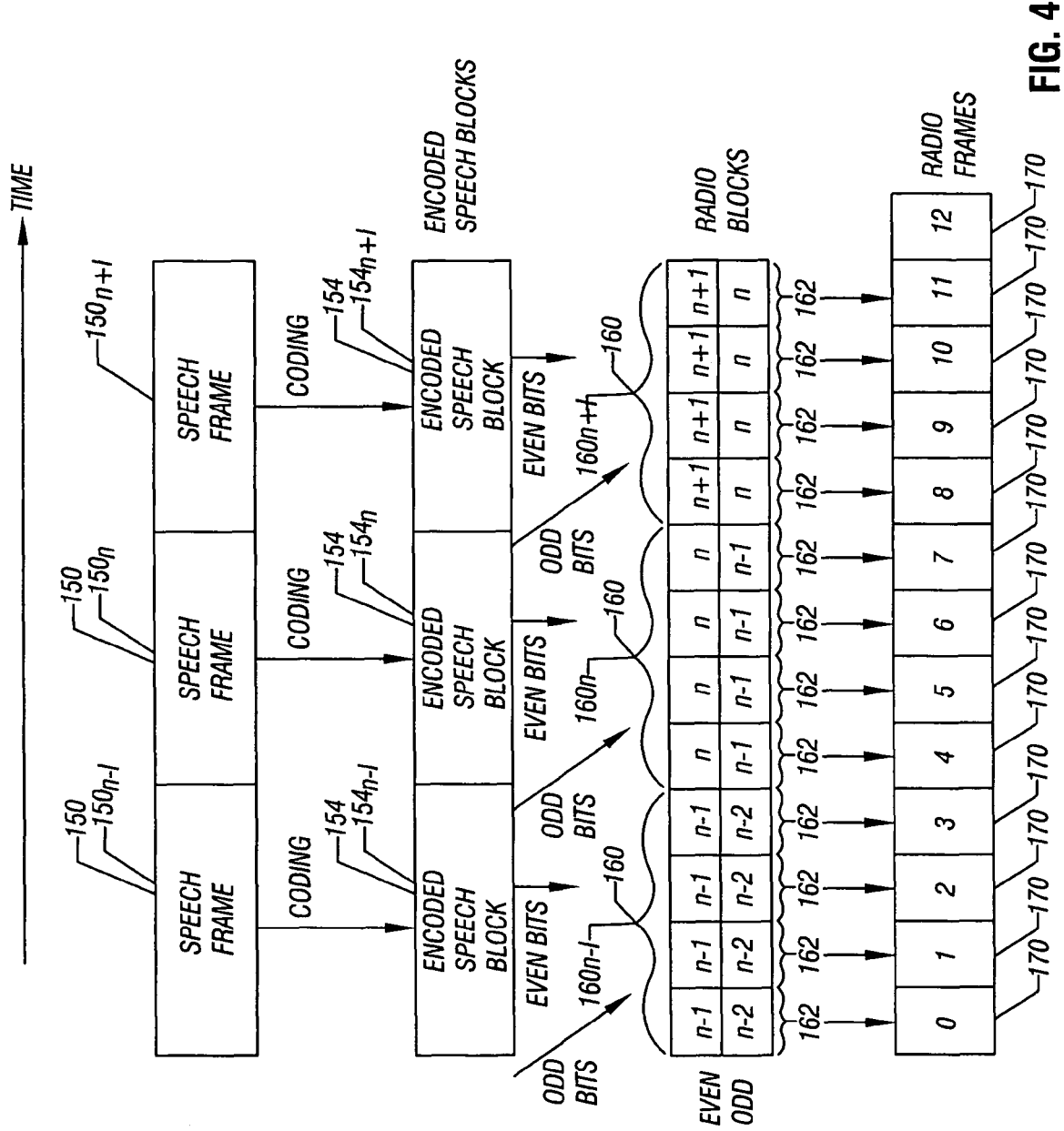
FIG. 4 is a diagram depicting the generation of radio blocks from speech frames according to an embodiment of the invention.

FIG. 4 depicts the conversion of exemplary speech frames 150 (speech frames $150_{n-1}$, $150_n$ and $150_{n+1}$, being depicted as examples) into exemplary radio frames 170, which are communicated across the wireless communication channel. Each speech frame 150 represents a digitized portion (20 milliseconds (ms), for example) of speech that is captured by the wireless device. The outgoing speech processing path 19 applies speech and channel encoding to the speech frames 150 to produce corresponding encoded speech blocks 154 (encoded speech blocks $154_{n-1}$, $154_n$ and $154_{n+1}$, being depicted as examples). Thus, for example, the outgoing speech processing path 19 applies speech and channel encoding to the speech frame $150_n$ to produce the corresponding encoded speech block $154_n$.

The outgoing speech processing path 19 converts the encoded speech blocks 154 into radio blocks 160 (radio blocks $160_{n-1}$, $160_n$ and $160_{n+1}$, being depicted as examples). To generate the radio blocks 160, the outgoing speech processing path 19 interleaves data from different encoded speech blocks 154. More specifically, each radial block 160, in accordance with some embodiments of the invention, includes the odd bits from one encoded speech block 154 and the even bits from the next successive encoded speech block 154. As a more specific example, the radio block $160_n$ is formed from odd bits from the encoded speech block $154_{n-1}$ and even bits from the encoded speech block $154_n$.

The outgoing speech processing path 19 converts the radio blocks 160 into corresponding radio frames 170, which are communicated across the wireless communication links. In this regard, in accordance with some embodiments of the invention, each radio block 160 contains four subblocks 162, and each radio subblock 162 forms in a particular radio frame 170. In this example, four radio frames 170 communicate the data in one radio block 160. Each radio frame 170, in accordance with some embodiments of the invention, corresponds to a time division multiple access (TDMA) time slot, as one time slot is used for a particular communication direction (i.e., for transmitting or receiving) in each TDMA frame of eight time slots.

The interleaving of the encoded speech blocks improves the receiver's ability to recover all data, should an interruption in transmission across the wireless communication channel occur. More specifically, the interleaving minimizes the amount of data, which may be lost from a particular radio block, should a communication interruption occur, as a particular burst only includes partial data from multiple radio blocks. The partial data loss allows the receiver to use forward error correction (FEC) to potentially recover any missing data. Such a recovery may not be possible if a significant portion of the data from a radio block were lost.

A difficulty with interleaving is that partial radio blocks are generated at the beginning and end of a transmission. More specifically, at the beginning of a transmission, the first radio block only contains half valid data, as there is only one encoded block at this point; and at the end of a transmission, the radio block only contains half valid data, as there is no subsequent encoded block to be transmitted. If undetected, partial radio blocks degrade the quality of speech that is produced by the wireless device on its output speaker system. Therefore, as described below, the wireless device evaluates incoming radio blocks for purposes of detecting partial blocks.

In accordance with embodiments of the invention described herein, the wireless device may be part of a mobile station, such as a cellular telephone, a personal digital assistant (PDA) or a computer with wireless capabilities, as just a few examples. The speech processing paths 17 and 19 may be part of an integrated circuit 15 (an application specific integrated circuit (ASIC), for example), in accordance with some embodiments of the invention.

As described herein, the wireless device has features to detect partial radio blocks that are received from the wireless communication channel. More specifically, in accordance with some embodiments of the invention, the incoming speech processing path 17 includes a channel decoder 45b that processes incoming radio blocks to, among other functions, detect partial radio blocks. In general, incoming radio blocks are deinterleaved for purposes of reconstructing the encoded speech blocks for speech and channel decoding via deinterleave buffers 48b. Upon identifying a partial radio block, the channel decoder 45b sets a flag to mark the block as being a full or a partial block.

Figure 2:
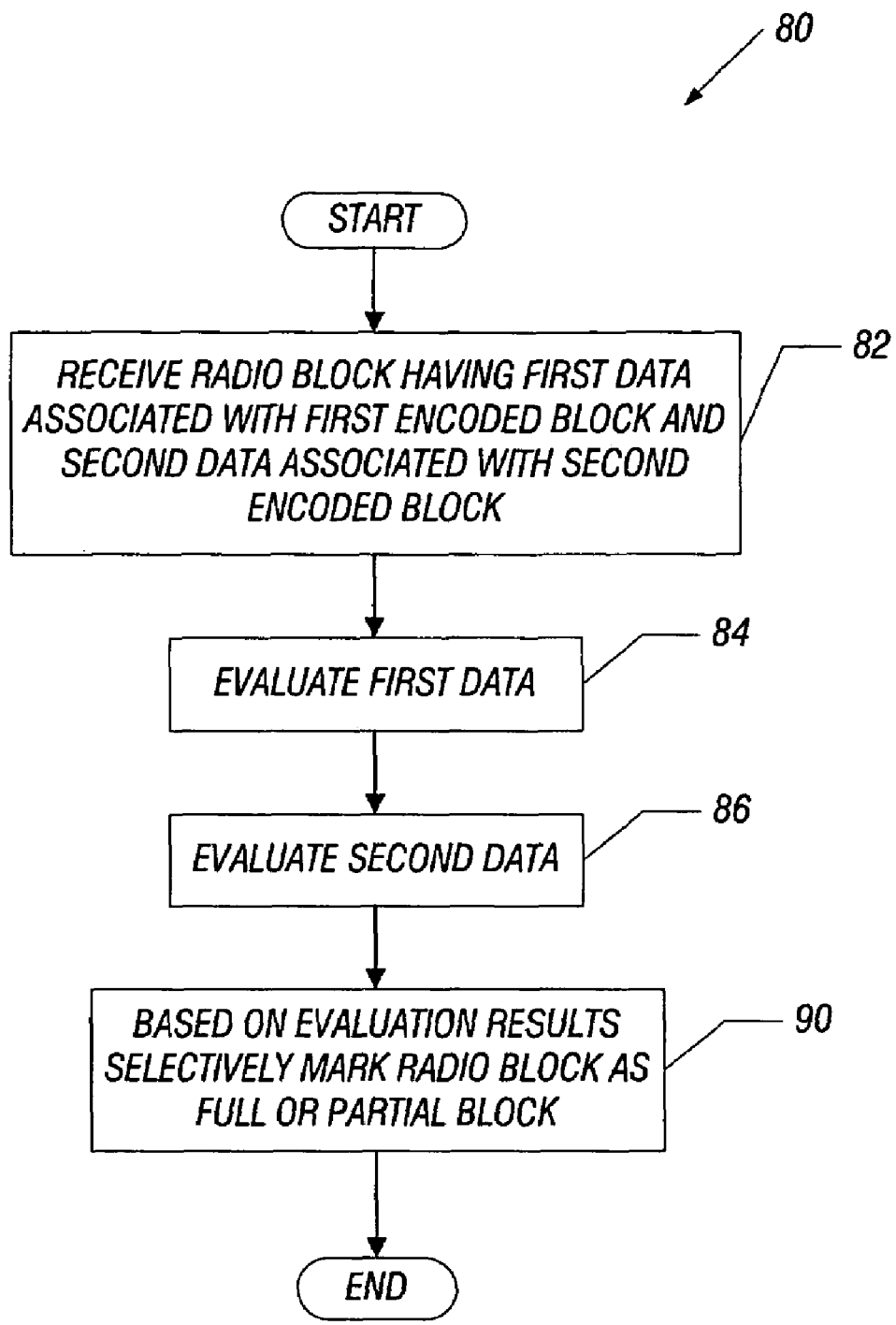
FIGS. 2, 3 and 6 are flow diagrams depicting techniques to detect partial radio blocks according to embodiments of the invention.

The channel decoder 45b, in accordance with some embodiments of the invention, determines whether a particular incoming radio block is a partial block by performing a technique 80 that is generally depicted in FIG. 2. Referring to FIG. 2 in conjunction with FIG. 1, pursuant to the technique 80, the channel decoder 45b receives (block 82) a radio block that has first data (that is ideally part of a valid first encoded speech block) and second data (that is ideally part of a valid second encoded speech block). The channel decoder 45b independently evaluates (block 84) the first data and evaluates (block 86) the second data. Based on the evaluation, the channel decoder 45b selectively marks the radio block as being a full or a partial block.

As a more specific example, in accordance with some embodiments of the invention, the channel decoder 45b may detect a partial radio block by independently evaluating the qualities (such as a quality evaluation that uses a soft decision sum, for example) of the first data and second data. If a comparison of the evaluated qualities reveals the qualities are vastly different, then the channel decoder 45b flags the radio block as being a partial block. This technique is to be contrasted to merely evaluating the quality of the entire radio frame (such as by a soft decision sum over the radio block, for example), which may not sufficiently indicate that the radio block is a partial block, due to valid data in one half of the radio block dominating the result.

Figure 3:
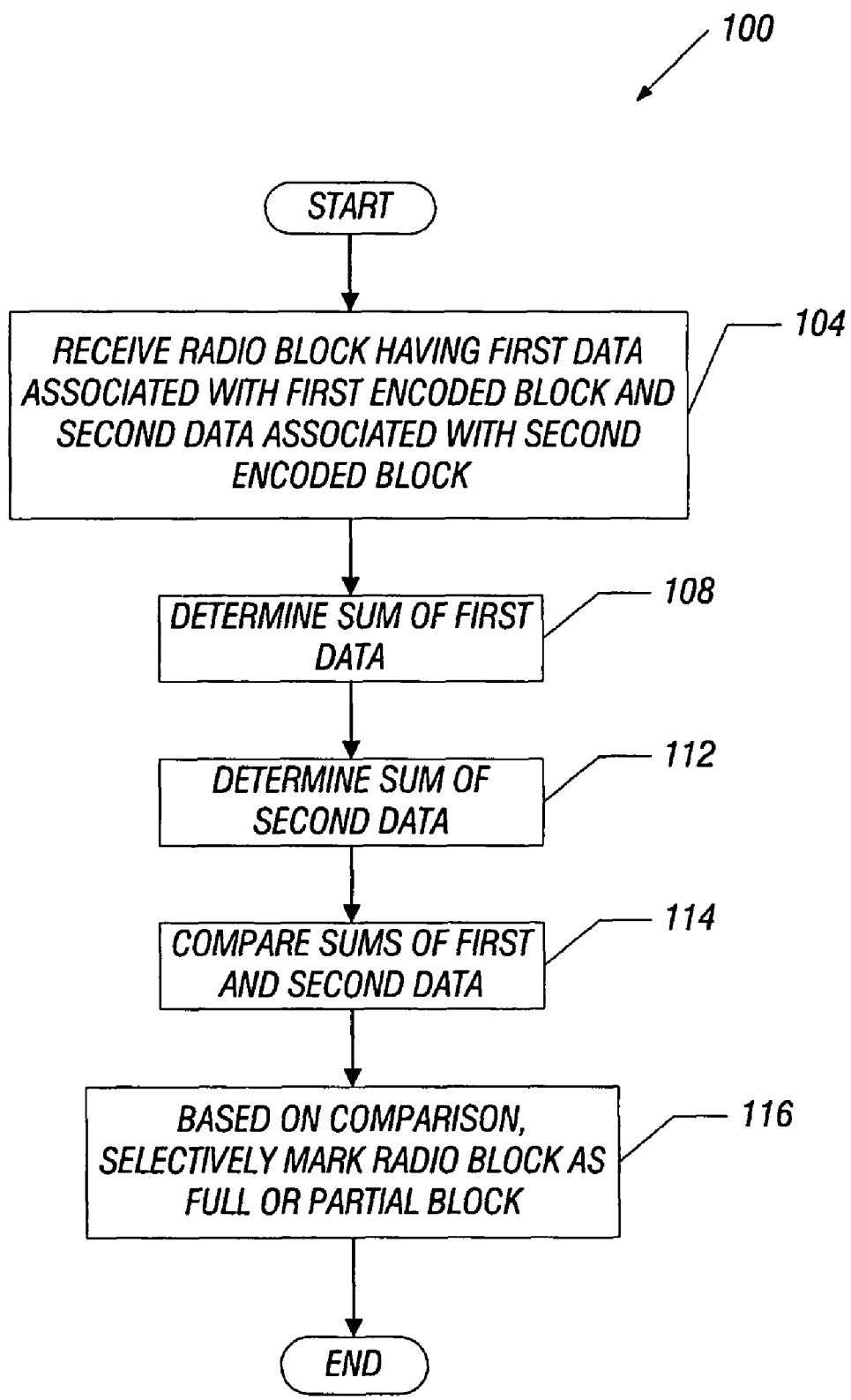

As another more specific example, referring to FIG. 3 in conjunction with FIG. 1, in accordance with some embodiments of the invention, the channel decoder 45b performs a technique 100 to detect a partial radio block. Pursuant to the technique 100, the channel decoder 45b receives (block 104) a radio block from a wireless communication channel, which has first data that is associated with a first encoded block and second data that is associated with a second encoded block. The channel decoder 45b determines (block 108) the sum of the first data and determines (block 112) the sum of the second data. Based on a comparison (block 114) of the sums of the first and second data (such as the comparison of the sums to a weighted total of the sums, for example), the channel decoder 45b selectively marks the radio block as being a full or a partial block, pursuant to block 116.

Referring back to FIG. 1, among the other features of the integrated circuit 15, the circuit 15 may include both baseband and radio frequency (RF) circuitry, in accordance with some embodiments of the invention. The baseband circuitry may include a digital signal processor (DSP) 10. The DSP 10 may process incoming and outgoing audio samples in accordance with various algorithms for filtering, coding, equalization, and the like.

While shown as including a number of particular components in the embodiment of FIG. 1, it is to be understood that DSP 10 may include additional components and similarly, some portions of DSP 10 shown in FIG. 1 may instead be accommodated outside of DSP 10. It is also to be understood that DSP 10 may be implemented as one or more processing units to perform the various functions shown in FIG. 1 under software control. That is, the functionality of the different components shown within DSP 10 may be performed by common hardware of the DSP according to one or more software routines. As further shown in FIG. 1, the integrated circuit 15 may further include a microcontroller unit (MCU) 65. The MCU 65 may be adapted to execute control applications and handle other functions of speech processing paths 15.

The DSP 10 may be adapted to perform various signal processing functions on audio data. While discussed in the context of audio processing, other data may also be processed by the embodiment of FIG. 1. In an uplink direction, DSP 10 may receive incoming voice information, for example, from a microphone 5 of the handset and process the voice information for an uplink transmission. This incoming audio data may be converted from an analog signal into a digital format using a codec 20 that is formed of an analog-to-digital converter (ADC) 18 and a digital-to-analog converter (DAC) 22, although only ADC 18 is used in the uplink direction. In some embodiments, the analog voice information may be sampled at 8 kilo samples per second (kS/s). The digitized sampled data may be stored in a temporary storage medium (not shown in FIG. 1). In some embodiments, one or more such buffers may be present in each of an uplink and downlink direction for temporary sample storage.

The audio samples may be collected and stored in the buffer until a complete data radio block is stored. While the size of such a data radio block may vary, in embodiments used in a time division multiple access (TDMA) system, a data frame (also referred to as a "speech frame") may correspond to 20 ms of real-time speech (e.g., corresponding to 160 speech samples). In various embodiments, the input buffer may hold 20 ms or more of speech data from ADC 18. As will be described further below, an output buffer (not shown in FIG. 1) may hold 20 ms or more of speech data to be conveyed to the DAC 22.

The buffered data samples may be provided to an audio processor 30a for further processing, such as equalization, volume control, fading, echo suppression, echo cancellation, noise suppression, automatic gain control (AGC), and the like. From audio processor 30a, data is provided to a vocoder 35 for encoding and compression. As shown in FIG. 1, vocoder 35 may include a speech encoder 42a in the uplink direction and a speech decoder 42b in a downlink direction. Vocoder 35 then passes the data to a channel codec 40 including a channel encoder 45a in the uplink direction and a channel decoder 45b in the downlink direction. From channel encoder 45a, data may be passed to a modem 50 for modulation. The modulated data is then provided to RF circuitry 60, which may be a transceiver including both receive and transmit functions to take the modulated baseband signals from modem 50 and convert them to a desired RF frequency (and vice versa). From there, the RF signals including the modulated data are transmitted from the handset via an antenna 70.

In the downlink direction, incoming RF signals may be received by an antenna 70 and provided to RF circuitry 60 for conversion to baseband signals. The transmission chain then occurs in reverse such that the modulated baseband signals are coupled through components of the downlink direction. As shown in FIG. 1, demodulated baseband signals (i.e., in-phase (I) and quadrature-phase (Q) signals) are provided to an I/Q buffer 46b for encoded storage. When a complete burst is received in I/Q buffer 46b, the baseband data is provided to an equalizer 47b, which is used to remove transmission channel characteristics from the data. After equalization, the data which may be in the form of both hard decisions and soft decisions corresponding to the received data, is stored in the deinterleave buffers 48b.

When sufficient data is stored in deinterleave buffers 48b, e.g., corresponding to a number of data bursts, the data may be provided to the channel decoder 45b. The channel decoder 45b may deinterleave the data from buffers 48b and perform decoding, for example, FEC decoding. The channel coded data is then provided to a speech decoder 42b of vocoder 35, and then in turn to an audio processor 30b, and DAC 22 (via a buffer, in some embodiments) to obtain analog audio data that is coupled to, for example, a speaker 8 of the handset.

For purposes of further illustration, the discussion is with respect to a representative GSM/general packet radio service (GPRS)/EDGE/TDMA system (generally a "GSM system"). However, other protocols may implement the methods and apparatus disclosed herein, particularly where data received by a system or a component of such a system is coded, for example, FEC-coded.

A GSM system makes use of a TDMA technique, in which each frequency channel is further subdivided into eight different time slots numbered from 0 to 7. Each of the eight time slots may be assigned to an individual user in GSM system, while multiple slots can be assigned to one user in a GPRS/EDGE system. A set of eight time slots is referred to herein as a TDMA frame, and may be a length of 4.615 ms. A 26-multiframe is used as a traffic channel frame structure for the representative system. The total length of a 26-frame structure is 26*4.615 ms=120 msec. In a GSM system, a speech frame is 20 msec while a radio block is 4 TDMA frames, which is 4*4.615=18.46 msec. Thus every three radio blocks the TDMA frame or radio block boundary and the speech frame boundaries are aligned.

Figure 5:
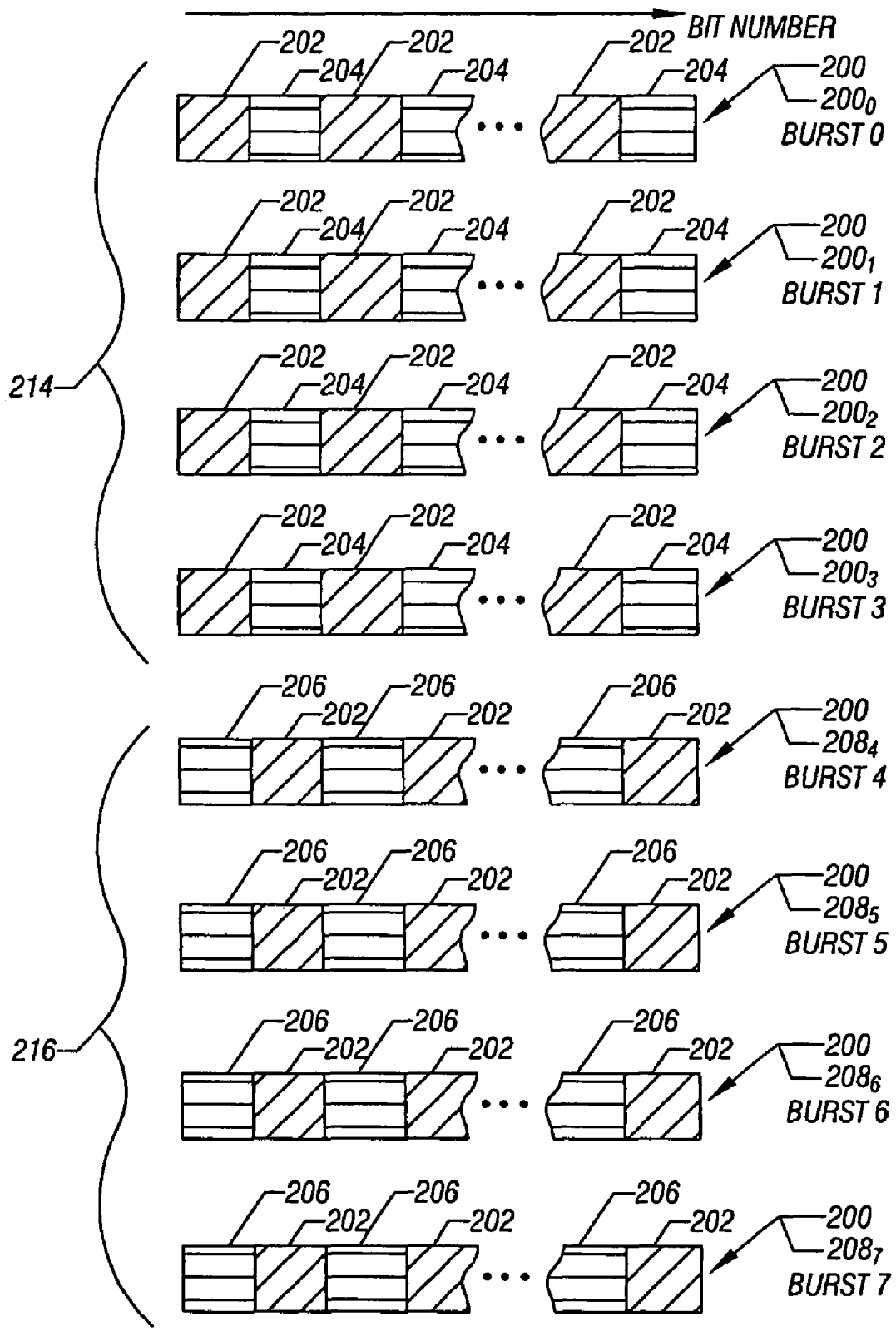
FIG. 5 is a schematic diagram illustrating radio blocks according to an embodiment of the invention.

FIG. 5 illustrates two successive radio blocks 214 and 216 which are received as a result of communication over a wireless communication channel, in accordance with some embodiments of the invention. In this example, four burst operations are used to communicate each radio block 214, 216. However, it is understood that fewer or more burst operations may be used to communicate radio blocks across the wireless communication channel in accordance with other embodiments of the invention. As depicted in FIG. 5, the radio block 214 is communicated in four burst operations $200_0$, $200_1$, $200_2$ and $200_3$; and the radio block 216 is communicated across the wireless communication channel in four burst operations $208_4$, $208_5$, $208_6$ and $208_7$.

Each radio block 214,216 includes data that is interleaved from two encoded speech blocks, although each block 214, 216 may include data from more than two encoded speech blocks, in accordance with other embodiments of the invention. For purposes of further improving the data integrity of the communication, each radio block 214, 216 contains data that is interleaved on the bit level. In this manner, the radio block 214 includes bits 202 at even bit positions (bit positions 0, 2, 4, etc.), which are from a particular encoded speech block; and the radio block 214 includes bits 204 that are located at odd bit positions in the frame 214 and are from another encoded speech block.

For the example that is depicted in FIG. 5, the bits 202 are part of an encoded speech block that is communicated in full via the two radio blocks 214 and 216. The bits 204 are from one half of an encoded speech block, the other half of which was communicated in the radio block (not shown) that immediately preceded the radio block 214. As depicted in FIG. 5, the bits 202 in radio block 216 are located at odd bit positions. The radio block 216 also includes bits 206 that are located at even bit positions and are part of one half of another encoded speech block; and the data for the remaining half of this encoded speech block is communicated in the radio block (not shown) that immediately follows the radio block 216.

If the radio block 214 is at the very beginning of a particular transmission, then the block 214 is a partial block, as the bits 204 are derived from a non-existent encoded speech block. Similarly, if the radio block 216 is at the very end of a transmission, the frame 216 is a partial block, as the bits 206 are derived from a non-existent encoded speech block.

Figure 6:
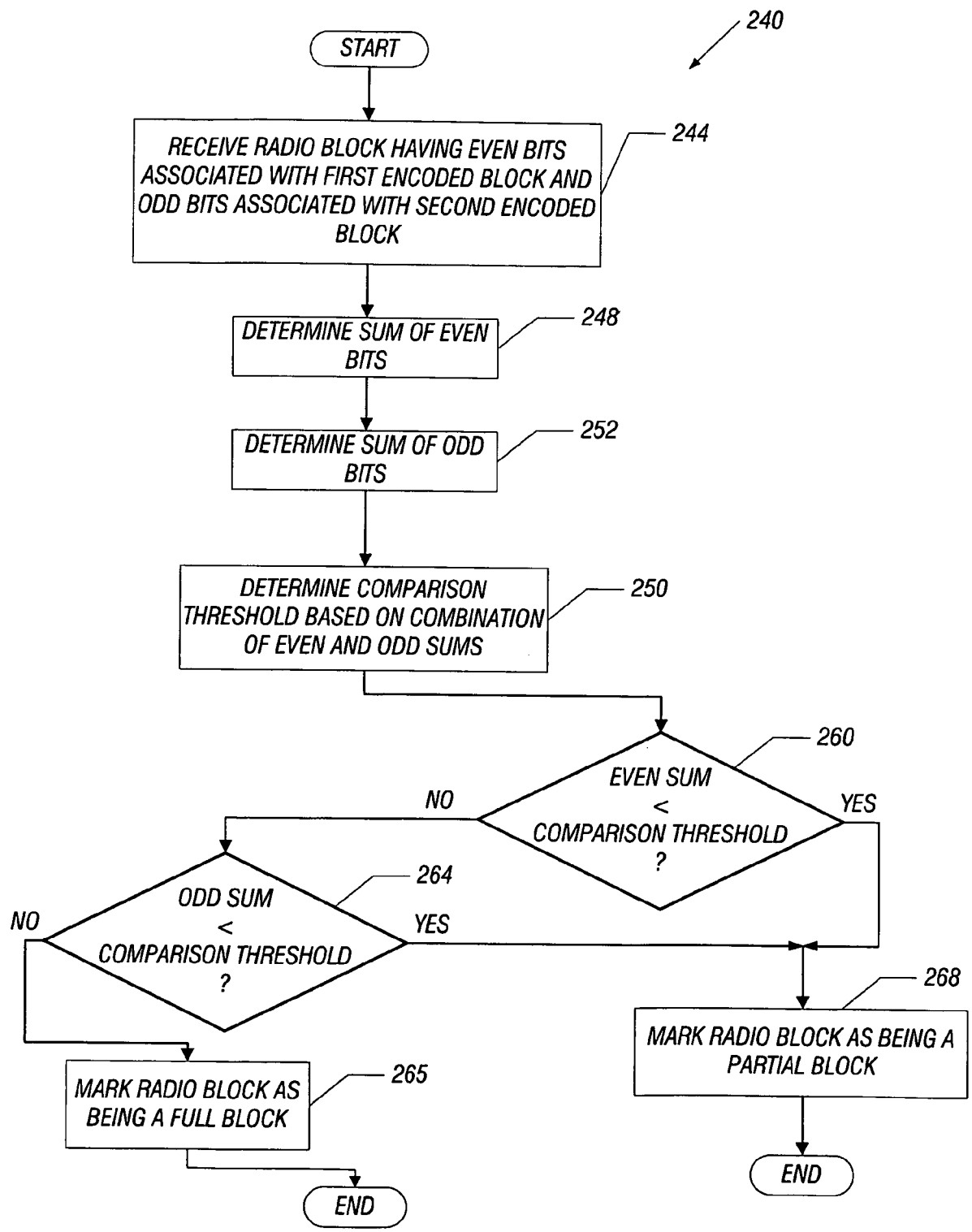

Due to the interleaving of bits in the even and odd positions, the channel decoder 45b may perform a technique 240, which is depicted in FIG. 6. Referring to FIG. 6 in conjunction with FIG. 1, in accordance with some embodiments of the invention, the channel decoder 45b processes a received radio block (block 244) that has even bits from a first encoded block and odd bits from a second encoded block. It is noted that the first or second encoded block may be non-existent, depending on whether the radio block is communicated at the beginning or end of a transmission. Pursuant to the technique 240, the channel decoder 45b determines (block 248) a sum of even data (i.e., the sum of soft decisions corresponding to even bits) and determines (block 252) a sum of the odd data (i.e., the sum of soft decisions corresponding to odd bits). The even and odd sums represent respective independent evaluations of the odd and even data. For purposes of comparing these evaluations, the channel decoder 45b determines (block 256) a comparison threshold from the even and odd sums.

More specifically, in accordance with some embodiments of the invention, the comparison threshold is a weighted total of the even and odd sums. Thus, the comparison threshold may be equal to the product of a scalar (0.25, as an example) and the total of the even and odd sums. The channel decoder 45b compares each of the odd and even sums to the comparison threshold to determine whether the even and odd sums are significantly different.

In this regard, in accordance with some embodiments of the invention, the channel decoder 45b determines (diamond 260) whether the even sum is less than the comparison threshold. If so, then a partial radio block has been detected, and the channel decoder 45b marks the radio block as being a partial block, pursuant to block 268. If the even sum is greater than or equal to the threshold, then the channel decoder 45b determines (diamond 264) whether the odd sum is less than the comparison threshold. If so, then a partial radio block has been detected, and the channel decoder 45b marks the block as being a partial block, pursuant to block 268. Otherwise, the channel decoder 45b marks the block as being a full block, pursuant to block 265.

Figure 7:
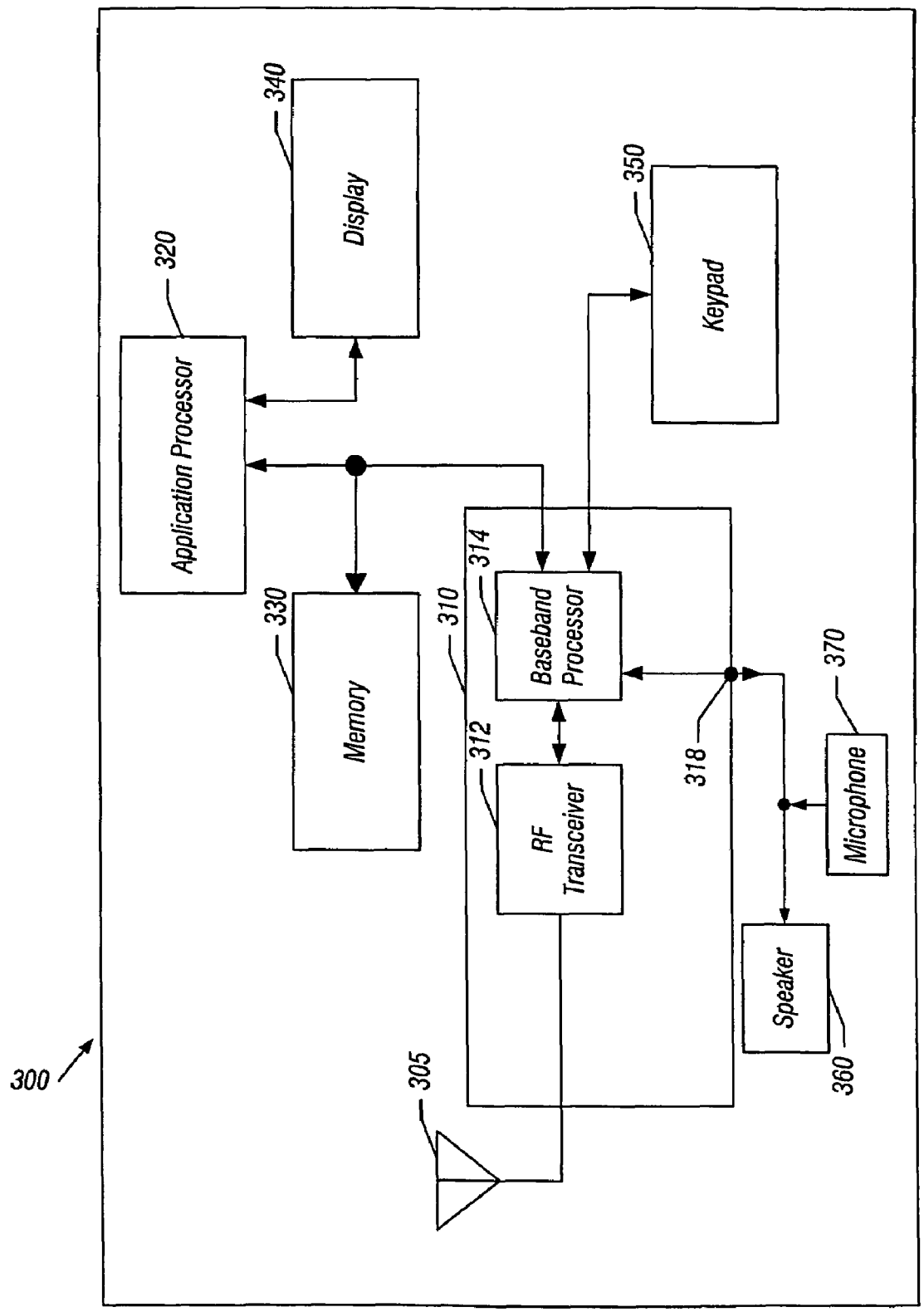
FIG. 7 is a schematic diagram of a mobile station according to an embodiment of the invention.

FIG. 7 depicts a block diagram of a mobile station 300 in accordance with some embodiments of the invention. The mobile station 300 may be a wireless device, such as a cellular telephone, PDA, portable computer or the like. An antenna 305 is present to receive and transmit RF signals. Antenna 305 may receive different bands of incoming RF signals using an antenna switch. For example, a quad-band receiver may be adapted to receive GSM communications, enhanced GSM (EGSM), digital cellular system (DCS) and personal communication system (PCS) signals, although the scope of the present invention is not so limited. In other embodiments, antenna 305 may be adapted for use in a GPRS device, a satellite tuner, or a wireless local area network (WLAN) device, for example.

Incoming RF signals are provided to a transceiver 310 which may be a single chip transceiver, including both RF components and baseband components. Transceiver 310 may be formed using a complementary metal-oxide-semiconductor (CMOS) process, in some embodiments. As shown in FIG. 7, the transceiver 310 includes an RF transceiver 312 and a baseband processor 314. RF transceiver 312 may include receive and transmit portions and may be adapted to provide frequency conversion between the RF spectrum and a baseband. Baseband signals are then provided to a baseband processor 314 for further processing.

In some embodiments, the transceiver 310 may correspond to the integrated circuit 15 of FIG. 1. Baseband processor 314, which may correspond to the DSP 10 of FIG. 1, may be coupled through a port 318, which in turn may be coupled to an internal speaker 360 to provide voice data to an end user. Port 318 also may be coupled to an internal microphone 370 to receive voice data from the end user.

After processing signals received from RF transceiver 312, the baseband processor 314 may provide such signals to various locations within the mobile station 300 including, for example, an application processor 320 and a memory 330. The application processor 320 may be a microprocessor, such as a central processing unit (CPU) to control operation of system 300 and further handle processing of application programs, such as personal information management (PIM) programs, email programs, downloaded games, and the like. The memory 330 may include different memory components, such as a flash memory and a read only memory (ROM), although the scope of the present invention is not so limited. Additionally, a display 340 is shown coupled to application processor 320 to provide display of information associated with telephone calls and application programs, for example. Furthermore, a keypad 350 may be present in the mobile station 300 to receive user input.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving an interleaved radio block from a communication channel, the radio block comprising a plurality of sub-blocks wherein each sub-block has first data and second data;
   evaluating the first data of the interleaved radio sub-block to obtain a first evaluation result, wherein the act of evaluating the first data comprises determining a first sum of the first data;
   evaluating the second data of the interleaved radio sub-block to obtain a second evaluation result, wherein the act of evaluating the second data comprises determining a second sum of the second data and wherein the first data is evaluated independent of the second data; and
   determining whether the interleaved radio block is a partial block based on the independent evaluations of the first and second data wherein the partial block includes half valid data, wherein the act of determining whether the radio block is a partial block comprises determining an average of the first and second sums and comparing the first and second sums to the average.

2. The method of claim 1, wherein the first data is associated with a first speech frame and the second data is associated with another speech frame.

3. The method of claim 2, wherein the first data comprises a portion of the first speech frame after the application of speech and channel encoding.

4. The method of claim 1, wherein the act of comparing the first and second sums to the average further comprises: comparing the first and second sums to a scaled average.

5. The method of claim 1, further comprising: selectively setting a flag to indicate whether the radio block is a partial block.

6. The method of claim 1, wherein the first and second data are interleaved at the bit level in the radio block.

7. The method of claim 1, wherein the first data comprises even bits from a first encoded block and the second data comprises odd bits from a second encoded block.

8. An apparatus comprising:
a buffer to receive an interleaved radio block of incoming wireless data, the radio block comprising a plurality of sub-blocks wherein each sub-block has first data and second data; and
a channel decoder to determine whether the interleaved radio block is valid based on results obtained by independent evaluations of the first and second data of the interleaved radio sub-block wherein an invalid radio block includes half valid data; and wherein the channel decoder independent evaluations comprise the channel decoder being adapted to determine a first sum of the first data; being adapted to determine a second sum of the second data; compare the first and second sums to a combination of the first and second sums and base the determination of whether the radio block is valid on the comparison.

9. The apparatus of claim 8, wherein the first data is associated with a first speech frame and the second data is associated with another speech frame.

10. The apparatus of claim 8, wherein the first and second data are interleaved at the bit level in the radio block.

11. The apparatus of claim 8, wherein the first data comprises even bits from a first encoded block and the second data comprises odd bits from a second encoded block.

12. A mobile station comprising:
a radio to receive an interleaved radio block of wireless data from a wireless communication channel, the radio block comprising a plurality of sub-blocks wherein each sub-block has first data associated with a first speech frame and second data associated with a second speech frame;
a digital signal adapted processor to determine whether the interleaved radio block is a partial block based on results obtained from independent evaluations of the first and second data wherein the partial block includes data from only one speech frame; and the independent evaluations comprising the digital signal processor being adapted to determine whether the radio block is a partial block based on the sum of the first data and a sum of the second data and a comparison of the sum of the first data and the sum of the second data with an average of the first and second sums of data.

13. The mobile station of claim 12, wherein the digital signal processor is adapted to selectively set a flag to indicate when the radio block is a partial block.

14. An article comprising a storage medium accessible by a processor-based system and storing instructions that when executed cause the processor-based system to perform:
receiving an interleaved radio block via a communication channel, the radio block comprising a plurality of sub-blocks wherein each sub-block has first data and second data; and
determining whether the interleaved radio block is a partial block based on results obtained from independent evaluations of the first and second data of the interleaved radio sub-block wherein the partial block includes half valid data; determining a first sum of the first data; determining a second sum of the second data; determining whether the radio block is a partial block based on a combination of: determining an average of the first and second sums; and comparing the first and second sums to the average.

* * * * *